Patented Jan. 16, 1945

2,367,296

UNITED STATES PATENT OFFICE 2,367,296

LEADED PHENOL RESINS AND A METHOD OF MAKING SUCH RESINS

Raymond P. Lutz, Oak Park, Ill., assignor to Western Electric Company, Incorporated, New York, N. Y., a corporation of New York No Drawing. Application January 9, 1942, Serial No. 426,166

13 Claims. (Cl. 250—108)

This invention relates to leaded phenol resins and a method of making such resins, and more particularly to shielding materials for X-rays and a method of making such materials.

In certain uses, and particularly when used as an X-ray shielding material, it may be desirable to incorporate metallic particles in a phenol resin. X-ray shielding materials comprising phenol resin containing substantial amounts of lead in the form of lead particles have been used. However, heretofore, due to the tendency of the lead particles to clump, adequate dispersion and, hence, sufficient insulation have not been obtained because mechanical mixing does not sufficiently break down these clumps or disperse the lead.

It is an object of the present invention to provide an improved leaded phenol resin which may be used for both an effective X-ray shield and insulator.

In accordance with this object, a small amount of finely divided carbon black may be added to a resinous material containing metallic particles such as lead. The whole is then thoroughly mixed together and molded into any desired shape. It has been found that the finely divided carbon black acts as a dispersing agent for the lead particles and results in an X-ray shielding material having greatly improved insulating properties. It appears that the carbon black acts as a lubricant and thereby increases the dispersion of the metallic particles in the resin mass.

In one embodiment of this invention 2 parts of finely divided carbon black may be added to 89.5 parts of lead powder and thoroughly mixed; then this composition is added to 66 parts of resin and 2.5 parts of dye; the whole is then pulverized and mixed. This mixture may be molded into a plate or other suitable shape in a mold under heat and pressure. The resultant material has been tested for insulating and shielding properties and been found to have a resistance approximately 100,000,000,000 times as high as a similar substance not containing carbon black. The X-ray shielding properties are in no way affected. Photo-micrographs of the material containing carbon black have been compared with photo-micrographs of material not containing carbon black and a striking difference in the dispersion of the lead is immediately apparent, the material containing carbon black showing practically no clumping. A similar phenomenon has been observed where carbon black has been used with other plastics containing fillers.

Thus the use of carbon black permits the manufacture of an X-ray shielding part from a lead filled phenol resin which will have high insulating properties. Further tests have shown that carbon black will assist in rapid and thorough dispersion of metallic fillers in other thermosetting plastic compounds such as urea formaldehyde resins.

The size of the carbon black grain is important and very finely divided carbon black must be used to secure optimum results. Carbon black having grains no larger than 200 millimicrons has been found to work satisfactorily.

Although a specific amount of carbon black has been suggested as optimum when used with a lead filled plastic, it has been found in practice that this amount may be increased to 1.5% or reduced to .3% without substantially affecting the results. Optimum results appear to be obtained when the amount of carbon black is about 1.25% of the total charge. The amount of lead and plastic material to be used, of course, depends upon the shielding desired, a larger proportion of lead producing a more effective shield.

It will be understood that although but one embodiment of the invention has been described, modifications and changes may be made therein without departing from the spirit and scope of the invention.

What is claimed is:

1. An X-ray shield containing on the order of 40% of resinous material and metallic particles and carbon black as a dispersing agent for said metallic particles to increase the electrical resistance of the shield material.

2. An X-ray shield containing from .3% to 1.5% carbon black, 56% lead powder, 2% dye and the balance resinous material.

3. An X-ray shield containing 2 parts carbon black, 89.5 parts lead powder, 66 parts resin and 2.5 parts of dye.

4. A method of making a resinous material containing a substantial quantity of lead particles electrically insulating, comprising dispersing the lead particles by adding carbon particles of a size on the order of 200 millimicrons.

5. An X-ray shielding material containing metallic particles, a binder therefor, and carbon particles of a size on the order of 200 millimicrons as a dispersing agent for the metallic particles.

6. An X-ray shielding material containing metallic particles, a binder therefor, and from .3% to 1.5% carbon particles of a size on the order of 200 millimicrons as a dispersing agent for the metallic particles.

7. An X-ray shield material comprising on the rder of 50% lead powder, .3% to 1.5% carbon black and the balance resinous material.

8. An X-ray shielding material containing on the order of 40% of a resinous material, metallic particles and carbon black as a dispersing agent for the metallic particles.

9. An X-ray shielding material containing on the order of 40% of a resinous material, lead particles, and carbon black as a dispersing agent therefor.

10. An insulating material containing on the order of 50% of metallic material in a binder consisting of approximately 40% resinous material and carbon black as a dispersing agent for the metallic material.

11. An insulating material containing on the order of 50% of lead in a binder consisting of approximately 40% resinous material and carbon black as a dispersing agent for the lead.

12. An X-ray shield containing on the order of 40% resinous material, lead particles, and .3% to 1.5% carbon black as a dispersing agent for the lead particles.

13. An X-ray shield material containing on the order of 40% resinous material, 56% lead powder and .3% to 1.5% carbon black.

RAYMOND P. LUTZ.